United States Patent [19]
Schuppan

[11] Patent Number: 6,099,877
[45] Date of Patent: *Aug. 8, 2000

[54] FOOD PRODUCT THAT MAINTAINS A FLAME

[76] Inventor: Robert L. Schuppan, P.O. Box 35, Palatine, Ill. 60078

[ * ] Notice: This patent is subject to a terminal disclaimer.

[21] Appl. No.: 07/867,049

[22] Filed: Apr. 10, 1992

[51] Int. Cl.⁷ ........................................ A23G 3/00
[52] U.S. Cl. ........................................ 426/104; 431/288
[58] Field of Search .............................. 426/104; 431/288

[56] References Cited

U.S. PATENT DOCUMENTS 3,630,697 12/1971 Duling et al. .
4,813,975 3/1989 Poulina et al. .

FOREIGN PATENT DOCUMENTS 63-42652 2/1988 Japan .
840382 5/1986 Netherlands .

OTHER PUBLICATIONS

Bepu, N., Chemical Abstracts, CA 106(4):20292g, 1986.
Lin, T. J., Chemical Abstracts, CA 80(16):87430p, 1974.
G.G. Hawley, Condensed Chemical Dictionary 864–65, 920, published before Feb. 22, 1984, New York.

Primary Examiner—Milton Cano

[57] ABSTRACT

A food product that maintains a flame comprising an edible wick. The food product may be surrounded by an edible, meltable foodstuff. Also disclosed is a string-less wick, which may be used in an edible candle or a non-edible candle or serve as an edible or non-edible candle itself.

7 Claims, 2 Drawing Sheets

FOOD PRODUCT THAT MAINTAINS A FLAME

BACKGROUND OF THE INVENTION

1. Field of the Invention

The present invention concerns a food product that maintains a flame. In one embodiment of the invention, the food product is meltable. More particularly, the present invention relates to an edible candle. Still more particularly, this invention relates to the making, fabricating, or producing of a product or substance out of strictly edible materials to serve as a candle with edible properties. In another embodiment, the invention relates to a non-string wick, which can be used in either an edible candle or a non-edible candle or serve as an edible or non-edible candle itself.

2. Background Information

A candle is defined as a light or torch, a cylindrical body of tallow, wax, spermaceti, or other fatty material formed on a wick composed of linen or cotton threads woven, or twisted loosely, and used for a portable light, and anything like a candle in form and use. A "candle" used herein shall be used as such and shall include all other products including sparklers and flares when used in a manner as a candle.

It is customary to decorate cakes, e.g., birthday cakes, pies, cup cakes, cookies, ice cream or other food or non-food products herein called "substrates", at festive occasions such as birthday parties, anniversary parties, graduation parties, weddings, retirement parties and holidays with candles. A typical candle is made entirely of a wick and wax fuel. The function of the wick in a candle is to deliver by capillary action fine streams of a burnable fuel, e.g., wax. The wax that isn't wicked to the flame and burned, however, drips on the cake and the like, which renders a portion of the cake inedible and creates an unpleasant appearance on the surface of the cake. Moreover, children frequently try to eat candles despite their "inedible" nature.

Stated otherwise, birthday candles, candles, sparklers or products of similar nature can create drippings or residue which do not add residual value to the substrate product and usually detract from it, often requiring the removal and/or disposal of the candle and/or residue, and/or the substrate material as well.

A typical candle is described in U.S. Pat. No. 1,958,462. U.S. Pat. No. 3,860,731 mentions edible waxes.

It would be desirable to have an edible candle that would drip an edible food product on cakes and the like, and which would be decorative. Furthermore, it would be desirable to have a candle which could be eaten (as a candy, for example) after being partially melted.

SUMMARY OF THE INVENTION

It is an object of the present invention to provide a food product that maintains a flame.

It is another object of the invention to provide a food product that maintains a flame and is meltable.

It is a further object of the present invention to provide an edible candle.

It is still another object of the present invention to provide an edible, chocolate, or otherwise flavored, candle.

It is also an object of the invention to provide a non-edible candle without a string wick.

It is another object of the present invention to provide a non-string wick which can be utilized in non-edible candles.

The above objects, as well as other objects, aims and advantages, are satisfied by the present invention.

The present invention concerns a food product that maintains a flame comprising an edible wick. In an embodiment of the invention, the edible wick is surrounded by an edible foodstuff. The foodstuff may be meltable.

The present invention also relates to an edible wick comprising (a) a suspended component that is fine granular or powdered, and edible and (b) an edible combustible component which serves as a source of fuel to maintain a flame.

The present invention is also directed to a non-string wick which comprises (a) a suspended component that is fine granular or powdered and (b) a combustible component which serves as a source of fuel to maintain a flame.

In another embodiment of the invention, the non-string wick can be utilized in non-edible candles.

BRIEF DESCRIPTION OF THE DRAWINGS

For the purposes of illustrating the invention there is shown in FIG. 1 a form which is presently preferred. It is to be understood, however, that the present invention is not limited to the precise arrangements and instrumentalities depicted in the drawing.

DETAILED DESCRIPTION OF THE INVENTION

The present invention in a preferred embodiment concerns a food product that maintains a flame and melts, i.e., an edible candle. The food product may be meltable. The food product comprises an edible wick and is preferably surrounded by an edible foodstuff.

The present invention relates to the making or forming of a candle by its definition for any use or in any shape or form which combines the properties of flammability and edibility.

This invention serves to improve existing candles by its ability to reduce or eliminate any inedible residual which might require removal and/or disposal in that the candle itself and any residual is edible and will add benefit to the substrate material. The candle and residue could contain flavorings and colors to contribute a variety of new or complementary tastes to the substrate including chocolate, fruit, and mint flavors.

This invention relates to an edible candle, substances from which to form such a candle, and methods to construct or produce this product.

The edible candle may be prepared from any of a variety of edible materials or combinations of materials where one or more of these materials contributes the flammable nature of the product.

The flammable element can be composed of a fat or any of a number of possible carbohydrate materials. Any specific flammable element may require an individualized application in the final product, depending upon the nature of that element, its level of flammability and physical properties.

A secondary ingredient may be utilized in intimate conjunction with the flammable material to regulate its level of flammability and/or its rate of combustion, and/or to provide wicking properties, and/or to alter the physical properties of the flammable element, and/or to alter or contribute color, odor, and/or flavor to the flammable element.

A third component of the candle is optionally used as an outer coating. The outer coating can serve to increase the quantity of residue left on the substrate and duplicate the appearance of a typical wax type candle. The outer coating could comprise any edible product to achieve a variety of taste, visual, and functional effects. Most commonly, the outer coating would comprise a fat which would melt as the wick or center flammable portion is burned. The outer coating would melt down the sides of the candle and onto the substrate. This outer coating can be flavored, sweetened and/or colored to achieve a variety of tastes, including but not limited to, chocolate and fruit flavors.

The food product of the invention may be shaped or formed to look similar to a typical wax type candle (cylindrical) or can be shaped or formed in any other shape to achieve special effects, such as but not limited to, animals, chocolate chips, numerals, letters, words, characters, figures, e.g., sports equipment or cars, or any other object or creative form.

Figure 1:
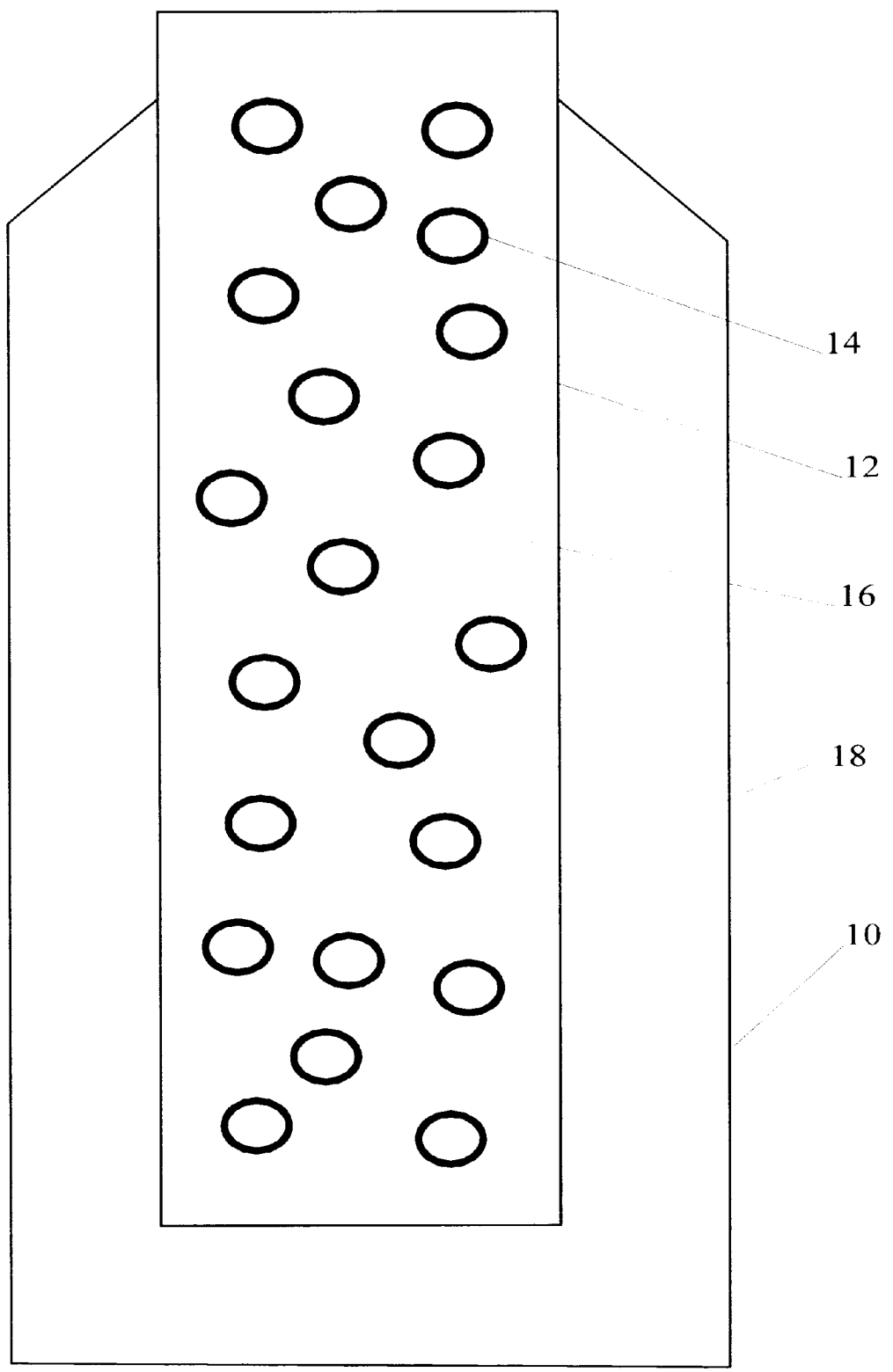
FIG. 1 is an elevational view in cross-section of an edible candle according to the present invention.
Figure 2:
FIG. 2 is a representation of the combustion of a flammable decoration according to the present invention.

Referring to the drawing, FIG. 1, wherein like reference numerals refer to like parts, there is depicted an edible candle 10 according to the present invention. The candle 10 comprises a two part system. The inner member of wick 12 ("part one") is edible and preferably is composed of a mixture of a granular or powdered edible product, e.g., silica gel 14 and is suspended in a combustible product 16 which serves as a source of fuel to maintain a flame and is preferably composed of a vegetable fat, vegetable oil, a glycol such as propylene glycol, wax, alcohol, liquor or other flammable material. Typical vegetable fats/oils are palm seed oil, soybean oil and cottonseed oil. The wick 12 can also include flavorings or odor components, such as peppermint oil (in this case peppermint oil may also act as the vegetable oil component). The wick 12 is surrounded by an edible foodstuff 18 ("part two").

In the aforesaid described embodiment, the wick 12 itself acts as a "candle" in that it includes its own fuel component 16, thus the foodstuff 18 is not utilized to fuel the fire and is thus not burned. By avoiding burning of the foodstuff 18, the foodstuff 18 retains its original flavor.

The foodstuff 18 is a candy or chocolate "candle stick". It is preferred to limit the use of sugar, e.g., sucrose, in the foodstuff 18 to avoid a carbon residue. Artificial sweeteners such as "ASPARTAME" can be employed. The foodstuff 18 preferably contains one or more vegetable fats. It is preferred to use a high melt point (95° F. to 110° F.) coating fat to provide shelf stability. The foodstuff 18 preferably should to be kept easy flowing during melting, so it melts down avoiding direct exposure to the flame.

The wick 12 diameter to foodstuff 18 diameter ratio should be such so as to maintain the flame.

A faster melting foodstuff can be employed, as opposed to using a thicker wick. The skilled artisan will also be able to control the rate at which the wick burns and how easily it breaks and falls off. Adding less solids in the foodstuff 18 or using a lower melt point may serve to improve drip upon melting.

Malto-dextrin may be added to the wick 12. Malto-dextrin melts when it gets fairly hot and becomes somewhat tacky. Malto-dextrin helps to keep the wick 12 on the "candle" at the base of the flame, making it less likely for the wick to break off and slide down the "candle".

Flour and/or fiber of many sources, including but not limited to corn, wheat, soy, rice or potato may be added to the wick formula. The flour and fiber are capable of wicking the fuel to the flame while behaving in different manners which can allow for the manufacture of wicks with varying properties. Wheat fiber, for example, tends to break apart a little more easily after it has been burned. In this improved formula it replaces and dilutes some of the fuel, which slows down the rate of burn, without significantly altering the flame.

Stearic acid can be used in place of the propylene glycol or vegetable fat. Stearic acid is a fatty substance which is capable of fueling the flame, yet it has a much higher melting point than propylene glycol or vegetable oil. The increase in melting point enables the wick to stay in place until it is burned, rather than melting and allowing the flame to slide off.

Preferred temperature ranges for components of the inventive food product are as follows:

outer casing melting point range: less than about 140° F., more preferably less than about 130° F., and most preferably between about 78° F. and 120° F.;

outer casing solidification point range: 78° F. to 120° F.;

wick melting point range: 78° F. to 160° F.;

wick solidification point range: 78° F. to 160° F.

The foodstuff 18 of the edible candle according to the invention can be chocolate flavored or chocolate in a mixture with other flavors, e.g., milk chocolate, white chocolate, fudge, dark chocolate, cherry chocolate, mint chocolate or mocha chocolate, or can be fruit flavored, e.g., orange, apple, pineapple, mango, tangerine, cherry, melon, plum, apricot, peach, lemon, lime, cranberry, boysenberry, raspberry, strawberry, blackberry, blueberry, grape, coconut, banana or mint flavored, for example, peppermint or spearmint, or nut flavored, for example, almond, amaretto, walnut, pecan, pistachio, hazelnut, peanut, or coffee flavored, mocha flavored, vanilla flavored, spice flavored, butterscotch flavored or rum flavored, or any other flavor.

The foodstuff component 18 may contain beeswax, but beeswax is not required.

A typical edible candle according to the present invention can be made as follows: hand roll the wick, then make the candle by dipping it in a melted foodstuff in a normal candle making method. In a production mode, these two materials could be co-extruded to form a continuous candle which would be cut to size and sharpened like a pencil to expose the wick at one end.

A formulation of typical ingredients found in the foodstuff component of the present invention for a chocolate or chocolate flavored edible candle would include the following: cocoa powder, a natural or artificial sweetener, milk powder, flavorings, an artificial sweetener and vegetable fats. To mask odors that may occur during burning, flavorings and/or scents can be added, e.g., an almond flavor.

In a second preferred embodiment of the invention, the above described wick 12 could be employed in non-food products. The wick 12, for example, can be utilized in a candle that is not edible. This will enable a candle to be made without the usual string wick and will permit very unusual shapes to be made without the worry of where the wick should be placed. In the case of such a non-edible candle, the wick may be incorporated into the candle as described herein for the case of edible candles with the exception that the outer coating can comprise non-edible materials, e.g., paraffins, or as an alternative, a non-edible candle can be prepared entirely of the wick material as described herein, using as an alternative, paraffin, wax or other non-edible materials as the fuel portion. The wick material can be shaped into any desired shape and will serve as the candle itself.

In another embodiment of the present invention, a conventional string wick is combined with a fuel component as described herein. The wick (comprising a wicking material and fuel) is coated with an edible outer casing according to the present invention.

In a further embodiment of the present invention, edible decorative articles are prepared from the wick (comprising a wicking material and fuel) of the present invention. For example, an edible wick (comprising a wicking material and fuel) is extruded into a shape or word using a syringe, pastry extruder, or the like. Alternatively, the wick (comprising a wicking material and fuel) is formed into a sheet and the decorative shape or word is "carved" out of the sheet. In another alternative, the wick (again a wicking material and fuel combination) is molded into a decorative shape or word. In yet another embodiment of the present invention, the wick (comprising a wicking component and fuel) is poured or dripped into the desired decorative shape or word.

The invention will now be described with reference to the following non-limiting examples.

EXAMPLE 1

Non-limiting examples of formulations for use in the present invention are as follows:

|  | weight % |
|---|---|
| "CHOCOLATE" FORMULA A | |
| Paramount X Vegetable Fat (manufactured by Durkee Foods) | 4.15 |
| Kaomel Vegetable Fat (manufactured by Durkee Foods) | 50.65 |
| Cocoa | 35.00 |
| Dextrose | 10.00 |
| "Aspartame" sweetener | .10 |
| Vanillin | .10 |
|  | 100.00% |
| "CHOCOLATE" FORMULA B & C | |
| Paramount X Vegetable Fat | 3.95 |
| Kaomel Vegetable Fat | 48.12 |
| Cocoa | 33.25 |
| Dextrose | 5.00 |
| "Aspartame" sweetener | .09 |
| Vanillin | .09 |
|  | 100.00% |
| WICK FORMULA A & B | |
| "DURASORB II" (manufactured by Durkee Foods) | 84.00 |
| Syloid 244 (Silica Gel) | 16.00 |
|  | 100.00% |
| WICK FORMULA C | |
| Propylene Glycol | 72.70 |
| Peppermint Oil | 9.10 |
| Syloid 244 (manufactured by Davison Chemical) (Silica Gel) | 18.20 |
|  | 100.00% |

In one application of the present invention, a candle was prepared using the chocolate formula B & C as an outer casing and wick formula C. These candles were molded inside plastic drinking straws. The center of one end was drilled out about 1 to 1¼ inches. The chocolate flavored candle was then pushed out of the straw and the hole was filled with a combustible gel containing silica gel, propylene glycol, and oil of peppermint.

"DURASORB II" is a stabilizer generally utilized in peanut butter. DURASORB II comprises soybean, cottonseed and palm oils with mono- and diglycerides.

Alternate wick and chocolate coating compositions are as follows:

| WICK | weight % |
|---|---|
| Stearic Acid | 67.0 |
| Silica Gel | 15.4 |
| Wheat Fiber* | 15.4 |
| 10 D.E. Malto-Dextrin | 2.2 |
|  | 100.0% |

*Other possible fibers: Rice Fiber, Soy Fiber, Corn Fiber and Oat Fiber.

| "CHOCOLATE" COATING | weight % |
|---|---|
| Wilbur K-805-112-45 Dark Coating | 52.5 |
| Blommer 115 Milk Coating | 4.0 |
| Dutched Cocoa | 8.0 |
| Paramount C Vegetable Fat | 24.3 |
| Paramount X Vegetable Fat | 8.0 |
| Dur-Em 117 Glycerol Mono-Stearate | 3.2 |
|  | 100.0% |

EXAMPLE 2

Candle With No Outer Coating

A candle with no outer coating that is flammable and edible was made using a mixture of 88% by weight fat derived from cottonseed and soy bean oils and 12% by weight silica gel. This mixture was combined over some heat to keep the fat melted until the silica absorbed all the fat resulting in a smooth consistent gel. This gel was allowed to set-up as it cooled to room temperature. A small piece of the resulting product was taken and rolled back and forth between the fingers, while exposing to some heat only to help form a softer plastic texture, which enabled the rolling action to reform the material into a long, thin, cylindrical string shaped object. This was allowed to set up again and was ignited and burned down completely, leaving the silica gel as a residue.

EXAMPLE 3

Candle With Outer Coating

The edible/burnable candle as made in Example 2 was used as a core for producing a candle with an outer coating to more accurately simulate the appearance and the melt down properties of a more typical wax type candle. The outer coating was made from a mixture containing 50% by weight of a 102° F. melt point fat of soybean and cotton seed oil origin, 25% by weight cocoa powder, 23.7% by weight dextrose, 1% by weight chocolate flavor, 0.15% by weight "NutraSweet" sweetener and 0.15% by weight vanillin. This mixture was made over heat to keep the fat melted. The finished candle was made by dipping the center core (see example 2) in the melted outer coating and removing it. The coating was allowed to set-up, then the procedure was repeated three additional times to form a heavy outer coating over the edible core. The resulting edible candle burned with properties very similar to a standard candle and left a edible silica gel residue.

EXAMPLE 4

An alternate method for forming the candle as in Example 2 was used to more easily and uniformly form the product.

The same formula was used as in Example 2, except the material was used before it was allowed to cool and set up. The material instead was placed into a syringe base (with no needle) and extruded out of its opening by applying pressure to the plunger. The extruded material was controlled in such a way as to form the material into a constant string of product. This product was able to be used in the same manner as Examples 2 and 3.

EXAMPLE 5

An alternate method for forming the candle as in Example 3 was made by molding the outer coating around the flammable core. The flammable core was held in place at the center of a plastic drinking straw cut to a 4 inch length. The melted outer coating material was poured into the straw around the center core and allowed to cool until set up. The end product was removed by pushing the candle out of the straw. This was accomplished by using the blunt end of a drill bit just slightly smaller than the straw opening. The sides of the straw were heated very slightly to make removal easier. The candle was pushed out and allowed to re-solidify prior to use. The product performed similarly to that in Example 3.

EXAMPLE 6

An alternate method for forming the candle as in Example 5 can be made with appropriate equipment and controls by co-extruding both substances, the flammable core, and the outer coating at the same time, one around the other. The same formulations as in Example 3 can be used or alternative formulations can be used. The process would involve extruding a center core similar to Example 4, while extruding the outer coating at the same time surrounding the center core. The rates of extrusion would have to be synchronized and the temperatures regulated to provide a quick set so as not to deform the finished product. This method would ideally use modern automated co-extrusion equipment.

EXAMPLE 7

An edible flammable candle was made using a flammable liquid core. This candle was made by using the molding process described in Example 5, except that only the outer coating was formed inside the straw with no flammable core at all. The outer coating material was then removed by the process described in Example 5. When set up, the outer coating material was hollowed out at one end by removing some of the outer coating material with the use of a small drill bit, turning the drill bit by hand. The cylinder was hollowed out about 1¼ inches into the cylinder. An alcohol was poured into the hollow core. The candle was burned on end and performed very well leaving less smoke and residue than some previous methods.

EXAMPLE 8

An edible flammable candle was made using a flammable gel. The same procedure as used in Example 7 to form a deep cavity in the end of a cylinder of outer coating material. A flammable mixture containing 87% by weight propylene glycol, 12% by weight silica gel, and 1% by weight peppermint oil. This gel mixture was placed into the cavity by placing it into a syringe with a needle. As pressure was applied to the plunger the gel filled into the cavity. This candle also worked very well and burned with little smoke and residue.

EXAMPLE 9

An edible flammable candle was made using the flammable gel in Example 8, and eliminating the use of the outer coating. This gel was used independently using a syringe without a needle to apply the flammable material directly on a substrate. It was applied both in small spots and by extruding it out in a pattern that read "Happy Birthday". When ignited, the candle burned cleanly and in the shape of the pattern on the substrate.

EXAMPLE 10

An edible/flammable candle was made in other shapes. A candle was made to look like a large chocolate chip. This candle was made by using the flammable core material as described in Example 2 and forming it by hand into the shape of a large chocolate chip with an elongated peak. The center core was then dipped into the outer coating material as in Example 3, to form the finished "chocolate chip" candle.

EXAMPLE 11

An alternative method was used to create a candle in the shape of a large chocolate chip as in Example 10. The flammable core material as in Example 2 was used and rolled out into a string shaped wick. A piece about ¾" long was broken off. The outer coating as in Example 3 was used in a melted state and dripped into large chocolate chip shaped pieces. While still in a melted state the ¾" piece of flammable core material was pushed down into the chip shape mound of coating material to result in a flammable chocolate chip shaped piece.

EXAMPLE 12

KAOKOTE III, 95 parts by weight, from Van Den Berge Foods (formerly Durkee Foods), and 5 parts, by weight, 07 STEARINE BEADS also from Van Den Berge Foods were blended by melting the fats and heating to 150 degrees fahrenheit while stirring. The 07 STEARINE BEADS were added to increase the melting point of the KAOCOTE III in order to achieve better shelf stability.

A standard white fiber string was dipped in the melted fat and then held taunt so that the string remained straight as the fat set up and harden. One end of the string was tied onto a raised, stationery object, such as a clothes line or ceiling fixture. A weight, such as a nut or bolt, was tied onto the other end of the string keeping the string straight and allowing the causing the fat on the string to harden and form a straight wick. Once hardened, the string wick was cut to the desired length, typically about 2 to 4 inches.

EXAMPLE 13

STEARIC ACID, 67 parts, by weight, was heated in a small pan until completely melted. SILICA GEL, 15.4 parts, by weight, 15.4 parts, by weight, WHEAT FIBER, and 2.2 parts, by weight, MALTO DEXTRIN were dry blended together to form a uniform mixture. The dry blend was quickly mixed into the melted STEARIC ACID to form a paste (or gel). Occasionally, additional heating was required. Two methods were used to form this paste into wicks. In the first method, the paste was put into a needleless syringe. The paste was extruded from the syringe into long cylindrical rods of the desired diameter. Once hardened, the wicks were cut to the desired length (typically about 2 to 4 inches). Alternatively, the melted paste was spread into a thin sheet on a piece of plastic film. The sheet, once hardened, was cut to the desired size.

EXAMPLE 14

An outer casing for a wick, consisting of a wicking material and fuel, of either Example 12 or 13, which when combined in a conventional manner with the wick simulates the appearance of a standard candle, was prepared. The candles of this example melt and drip freely so as to add their flavor to the product on which they are burned. This formula contains a very low melt point wax and oil mixture with very little solid materials to achieve an outer casing that melts quickly and flows easily, i.e., when melted, has a viscosity of less than about half that of a conventional chocolate.

CARNAUBA WAX, 17.8 parts by weight, and 80 parts, by weight, MAZOLA CORN OIL were combined in a small pot and heated until the wax melted. Throughout heating, the wax and oil mixture was constantly mixed to form a uniform blend. Thereafter, 1.1 parts by weight, of Colorcon Brown Color OD9079, 1 part, by weight, Food Materials 27660 Chocolate and 0.1 part, by weight, Aspartame were gradually added to the wax-oil blend.

EXAMPLE 15

An edible candle outer casing which provides an improved chocolate taste was prepared by melting chocolate and adding vegetable fat to the casing composition. The chocolate was modified to reduce the viscosity of the casing material to achieve an adequate flow down the candle and away from the wick.

A candle was prepared by dipping the wick consisting of the wicking component and fuel of Example 13 into this mixture. An approximately 2.5 inch candle lit easily and burned for about seven and a half minutes. However, during burning, the wick broke and slid down the candle, at which time it was replaced at the top of the candle.

A Chocolate flavored casing was prepared by melting 52.5 parts, by weight, Wilbur K-805-112-45 DARK COATING with 4 parts, by weight, Blommer 115 MILK CHOCOLATE COATING in a double boiler. Eight (8) parts by weight, DUTCHED COCOA were then well blended with the chocolate flavored casing eliminating any lumps, and dispersing the COCOA uniformly. A fat blend was prepared by melting and stirring 24.3 parts, by weight, PARAMOUNT C FAT, 9 parts, by weight, PARAMOUNT X FAT, and 3.2 parts, by weight, DUREM 177 GLYCEROL MONO-STEARATE in a separate container until these ingredients were dissolved and blended uniformly. The fat blend was added to the chocolate. Once these ingredients are well mixed, this formula is ready for use.

EXAMPLE 16

Candles were prepared by dipping a hardened wick (consisting of a wicking material and fuel) into melted outer casing material. While the outer casing material was heated sufficiently to melt it, it was kept as cool as possible to promote a quick set-up, and to prevent the melt-down of the wick (i.e., a wicking material and fuel) as well as the previously applied casing material. The wick was dipped into the outer casing material and quickly removed. The outer casing material that adhered to the wick was allowed to harden completely. Once hardened, the dipping was repeated until the desired outer casing thickness was achieved.

EXAMPLE 17

A candle with a uniform outer casing thickness was, produced using a string wick according to Example 12 and an outer casing according to Example 14 by molding. For this method, a standard plastic drinking straw was used. The straw was cut to the desired length of about 2 to 4 inches An approximately 3.5 inch candle of this Example burned for about 11 minutes after lighting readily.

Alternatively, candles of varying diameters were readily produced using plastic packaging tape that was rolled around a pencil or rod, or other cylindrical object of the desired diameter, with the sticky side of the tape away from the object.

One end of the plastic tube is dipped into melted outer casing material about ¼ to ½ inch, and immediately stood on that end on a flat working surface. The outer casing material is allowed to harden, forming a seal around the bottom of the tube, and holding the tube upright. The tubes are then filled with outer casing material, avoiding the entrapment of air bubbles in the tubes. A wick is then inserted into the filled tube and the outer casing material is allowed to set up.

The candle is removed from the tube by pushing it out from the bottom through the top using a blunt cylindrical object slightly smaller than the tube. Some slight warming of the tube may be helpful for easy removal of the candle.

It will be appreciated that the instant specification is set forth by way of illustration and not limitation, and that various modifications and changes may be made without departing from the spirit and scope of the present invention.

What is claimed is:

1. An edible wick comprising:
   (a) a suspended component capable of wicking that is fine granular or powdered, non-combustible and edible and;
   (b) an edible fuel wherein said combination of suspended component and fuel is effective to maintain a flame in a still room.

2. An edible wick according to claim 1, wherein said suspended component comprises silica gel.

3. An edible wick according to claim 1, wherein said fuel comprises a vegetable fat.

4. An edible wick according to claim 1, wherein said fuel comprises propylene glycol.

5. An edible wick according to claim 1, wherein said fuel comprises one or more of soybean oil, cottonseed oil and palm oil.

6. A candle comprising a wick according to claim 1.

7. An extrudable edible wick according to claim 1.

* * * * *